United States Patent
Branson et al.

(10) Patent No.: US 9,158,795 B2
(45) Date of Patent: Oct. 13, 2015

(54) COMPILE-TIME GROUPING OF TUPLES IN A STREAMING APPLICATION

(71) Applicant: International Business Machines Corporation, Armonk, NY (US)

(72) Inventors: Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/631,086

(22) Filed: Sep. 28, 2012

(65) Prior Publication Data

US 2014/0095503 A1   Apr. 3, 2014

(51) Int. Cl.
   *G06F 17/30*   (2006.01)

(52) U.S. Cl.
   CPC .... *G06F 17/30286* (2013.01); *G06F 17/30516* (2013.01)

(58) Field of Classification Search
   CPC .............................. G06F 8/41; G06F 17/30516
   USPC .......................................... 707/737; 717/140
   See application file for complete search history.

(56) References Cited

U.S. PATENT DOCUMENTS

| | | | |
|---|---|---|---|
| 5,404,541 A | 4/1995 | Hirosawa et al. | |
| 6,243,755 B1 * | 6/2001 | Takagi et al. | 709/229 |
| 7,613,848 B2 * | 11/2009 | Amini et al. | 710/29 |
| 7,644,110 B2 | 1/2010 | Nishizawa et al. | |
| 7,877,401 B1 * | 1/2011 | Hostetter et al. | 707/758 |
| 8,095,690 B2 * | 1/2012 | Kashiyama et al. | 710/1 |
| 8,112,541 B2 * | 2/2012 | Amini et al. | 709/231 |
| 8,769,485 B2 | 7/2014 | Salz et al. | |
| 2006/0004996 A1 * | 1/2006 | Gonion | 712/241 |
| 2008/0134158 A1 * | 6/2008 | Salz et al. | 717/148 |
| 2009/0248749 A1 * | 10/2009 | Gu et al. | 707/104.1 |
| 2009/0300615 A1 | 12/2009 | Andrade et al. | |
| 2010/0106946 A1 * | 4/2010 | Imaki et al. | 712/220 |
| 2010/0138438 A1 * | 6/2010 | Torikai et al. | 707/759 |
| 2010/0229178 A1 * | 9/2010 | Ito | 718/104 |
| 2010/0293532 A1 * | 11/2010 | Andrade et al. | 717/140 |
| 2010/0318768 A1 * | 12/2010 | Bouillet et al. | 712/203 |
| 2011/0016160 A1 | 1/2011 | Zhang et al. | |

(Continued)

OTHER PUBLICATIONS

Bugra Gedik et al., "SPADE: The System S Declarative Stream Processing Engine", 2008, ACM, SIGMOD '08 Jun. 9-12, 2008, pp. 1123-1134.*

(Continued)

*Primary Examiner* — Pierre Vital
*Assistant Examiner* — Nargis Sultana
(74) *Attorney, Agent, or Firm* — Jonathan V. Sry; James R. Nock

(57) ABSTRACT

A system and a method for initializing a streaming application are disclosed. The method may include initializing a streaming application for execution on one or more compute nodes which are adapted to execute one or more stream operators. The method may, during a compiling of code, identify whether a processing condition exists at a first stream operator of a plurality of stream operators. The method may add a grouping condition to a second stream operator of the plurality of stream operators if the processing condition exists. The method may provide for the second stream operator to group tuples for sending to the first stream operator.

8 Claims, 9 Drawing Sheets

(56) References Cited

U.S. PATENT DOCUMENTS

| | | | |
|---|---|---|---|
| 2011/0040709 A1 | 2/2011 | Proctor et al. | |
| 2011/0040827 A1* | 2/2011 | Katsunuma et al. | 709/203 |
| 2011/0314019 A1* | 12/2011 | Jimenez Peris et al. | 707/737 |
| 2012/0002733 A1* | 1/2012 | Misra et al. | 375/259 |
| 2012/0078951 A1* | 3/2012 | Hsu et al. | 707/769 |
| 2012/0078975 A1* | 3/2012 | Chen et al. | 707/803 |
| 2012/0079466 A1* | 3/2012 | Gonion | 717/150 |
| 2012/0218268 A1* | 8/2012 | Accola et al. | 345/440 |
| 2012/0297168 A1* | 11/2012 | Chen et al. | 712/206 |
| 2013/0018885 A1* | 1/2013 | Guenkova-Luy | 707/737 |
| 2013/0159980 A1* | 6/2013 | Braude | 717/140 |
| 2013/0166617 A1* | 6/2013 | Branson et al. | 709/201 |
| 2013/0166618 A1* | 6/2013 | Branson et al. | 709/201 |
| 2013/0305225 A1 | 11/2013 | Branson et al. | |
| 2014/0095506 A1 | 4/2014 | Branson et al. | |
| 2014/0122559 A1 | 5/2014 | Branson et al. | |

OTHER PUBLICATIONS

IBM, "IBM Streams Processing Language Compiler Usage Reference", IBM InfoSphere Streams Version 2.0.0.4, © IBM Corporation 2011, 2012. http://publib.boulder.ibm.com/infocenter/streams/v2r0/topic/com.ibm.swg.im.infosphere.streams.product.doc/doc/IBMInfoSphereStreams-SPLCompilerUsageReference.pdf.

Ballard et al., "IBM InfoSphere Streams: Harnessing Data in Motion", Sep. 2010. 360 pages, IBM Redbooks. http://www.redbooks.ibm.com/abstracts/sg247865.html.

Santosuosso et al., "Management System for Processing Streaming Data", filed Jul. 26, 2011. U.S. Appl. No. 13/190,810.

Branson et al., "Runtime Grouping of Tuples in a Streaming Application", filed Nov. 26, 2012. U.S. Appl. No. 13/662,931.

IBM, "Installation and Administration Guide", IBM Infosphere Version 1.2.1, © IBM Corporation 2009, 2010. http://www-01.ibm.com/support/docview.wss?uid=swg27018039&aid=1.

* cited by examiner

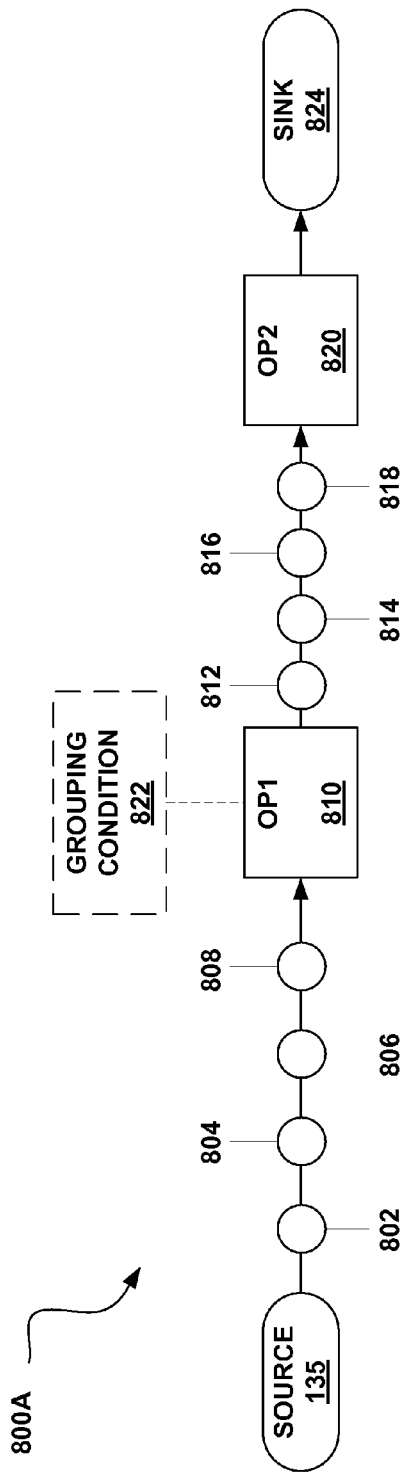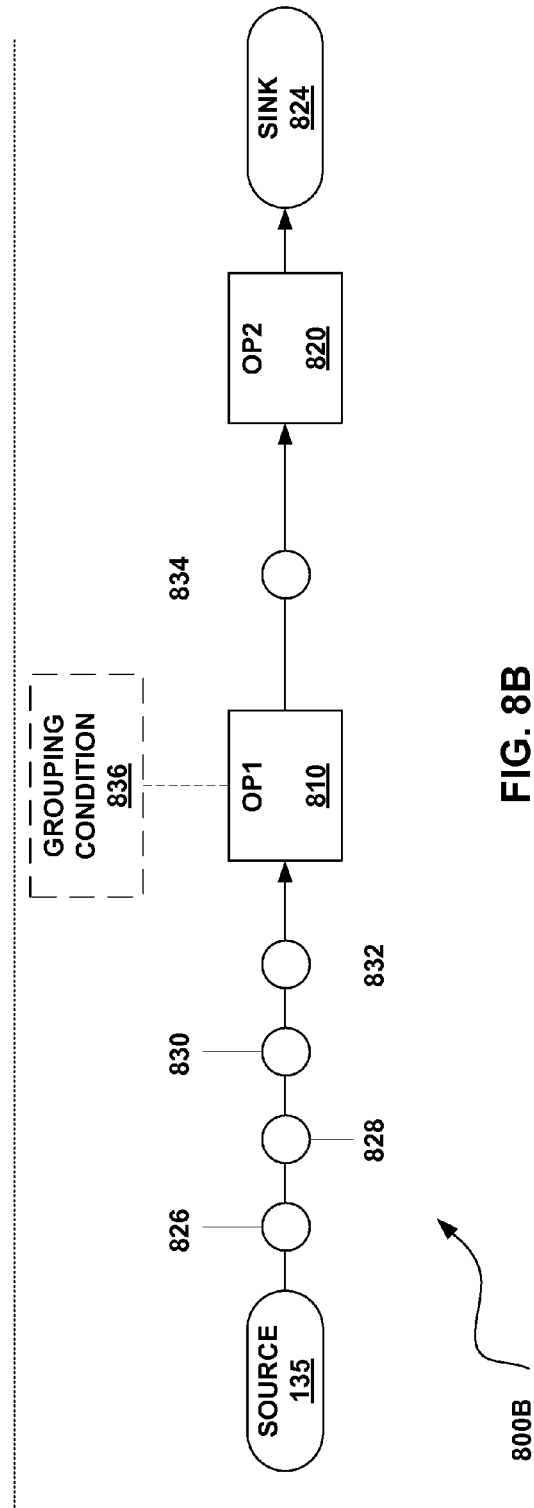
FIG. 8A
FIG. 8B

COMPILE-TIME GROUPING OF TUPLES IN A STREAMING APPLICATION

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

One embodiment is directed to a method for processing a stream of tuples in a stream-based application. The method may include initializing a streaming application for execution on one or more compute nodes which are adapted to execute one or more stream operators. The method may, during a compiling of code, identify whether a processing condition exists at a first stream operator of a plurality of stream operators. The method may add a grouping condition to a second stream operator of the plurality of stream operators if the processing condition exists. The method may provide for the second stream operator to group tuples for sending to the first stream operator. The method may improve the performance of the streaming application by reducing calls to the transport layer once the streaming application is deployed and running.

Another embodiment is directed to a system for processing a stream of tuples in a stream-based application. The system may include one or more processors and a memory that may contain a program which may be configured to initialize a streaming application for execution on one or more compute nodes. The system may, during a compiling of code, identify whether a processing condition exists at a first stream operator of a plurality of stream operators. The system may add a grouping condition to a second stream operator of the plurality of stream operators if the processing condition exists. The system may provide for the second stream operator to group tuples for sending to the first stream operator. The system may improve the performance of the streaming application by reducing calls to the transport layer once the streaming application is deployed and running.

Yet another embodiment is directed to a computer program product.

BRIEF DESCRIPTION OF THE DRAWINGS

FIGS. 8A and 8B illustrate a more detailed view of a tuple grouping process according to various embodiments.

Like reference numbers and designations in the various drawings indicate like elements.

DETAILED DESCRIPTION

Figure 1:
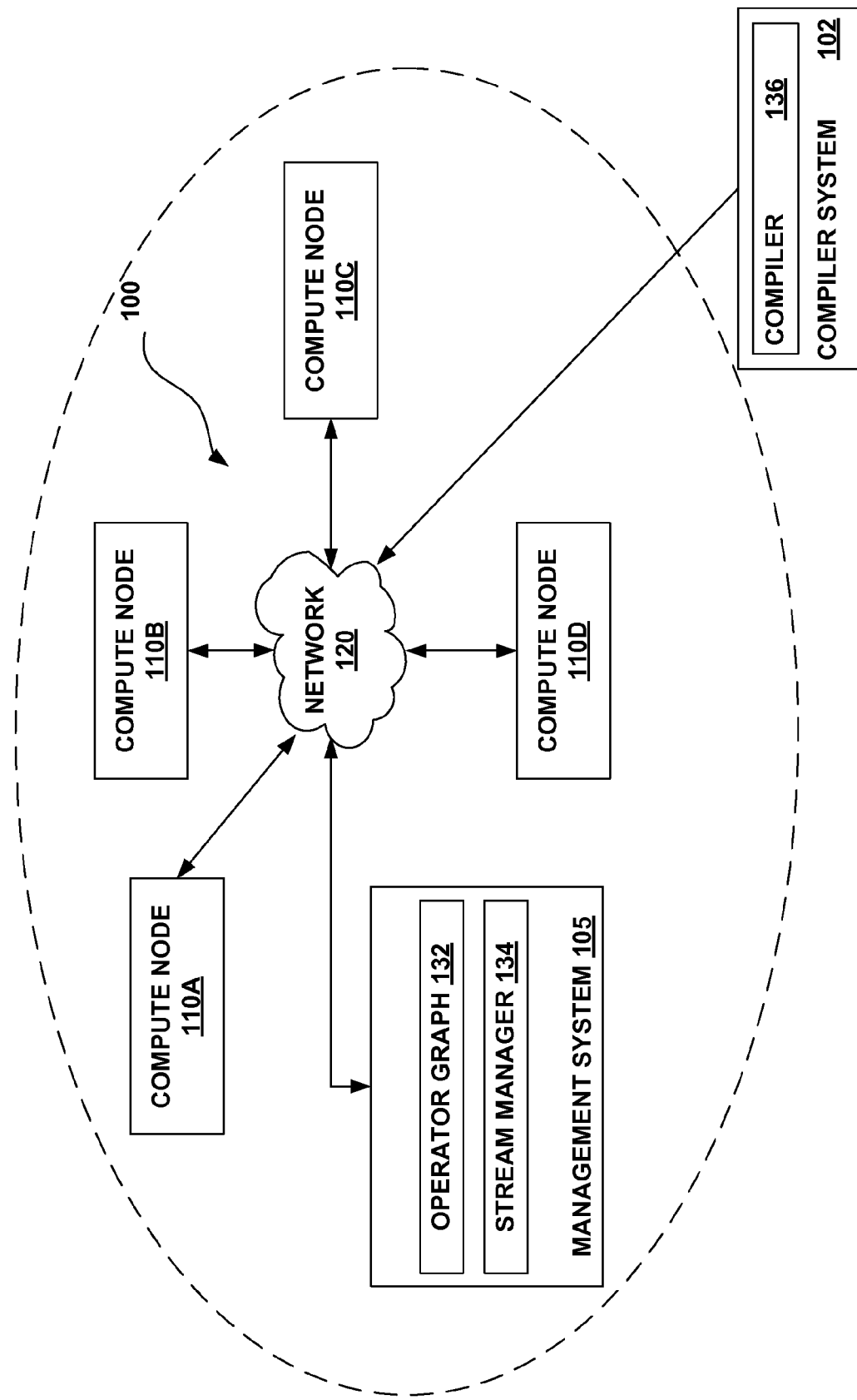
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Stream operators may be classified into levels. A level, as referred to herein, may be defined as a number of subsequent stream operators from a particular stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with a thing. Examples of attributes may be any of a variety of different types, e.g., integer, float, Boolean, string, etc. The attributes may be ordered. A tuple may be extended by adding one or more additional attributes to it. In addition to attributes associated with a thing, a tuple may include metadata, i.e., data about the tuple. As used herein, "stream" or "data stream" refers to a sequence of tuples. Generally, a stream may be considered a pseudo-infinite sequence of tuples.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Embodiments disclosed herein are directed to methods and apparatuses that enhance the ability of a streaming application to efficiently and rapidly process a received data stream. In one embodiment, it may be determined that a particular stream operator has a processing condition that requires a group of tuples before processing can occur. It may be possible to identify these processing conditions at compile-time. It may also be possible to add a grouping condition to a stream operator. The grouping condition may be added to a stream operator that provides input to the stream operator having a processing condition. The grouping condition may specify that tuples be grouped in a manner similar to the processing condition. Adding a grouping condition to a stream operator may improve the performance of the streaming application by reducing calls to the transport layer once the streaming application is deployed and running.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
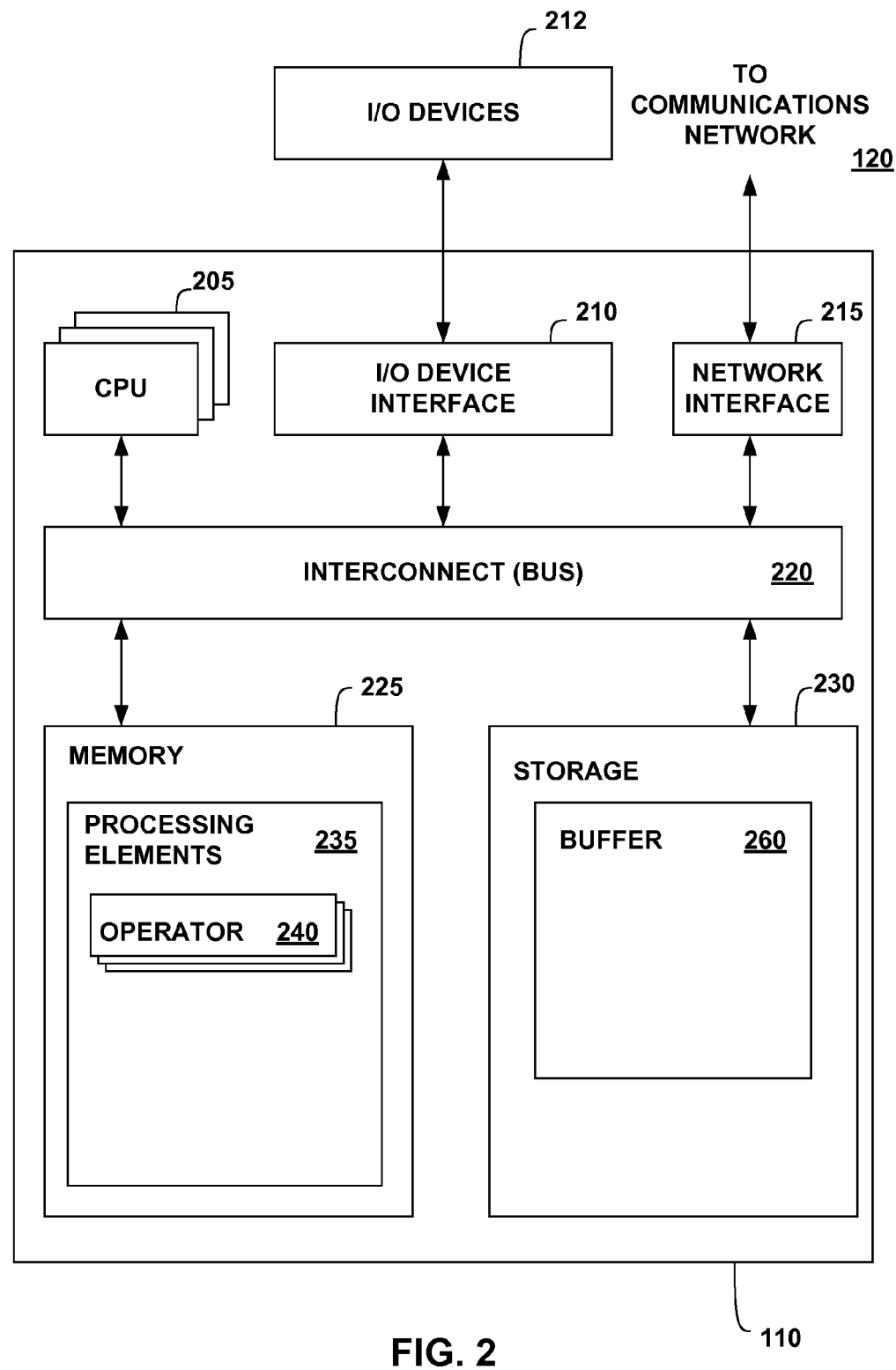
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
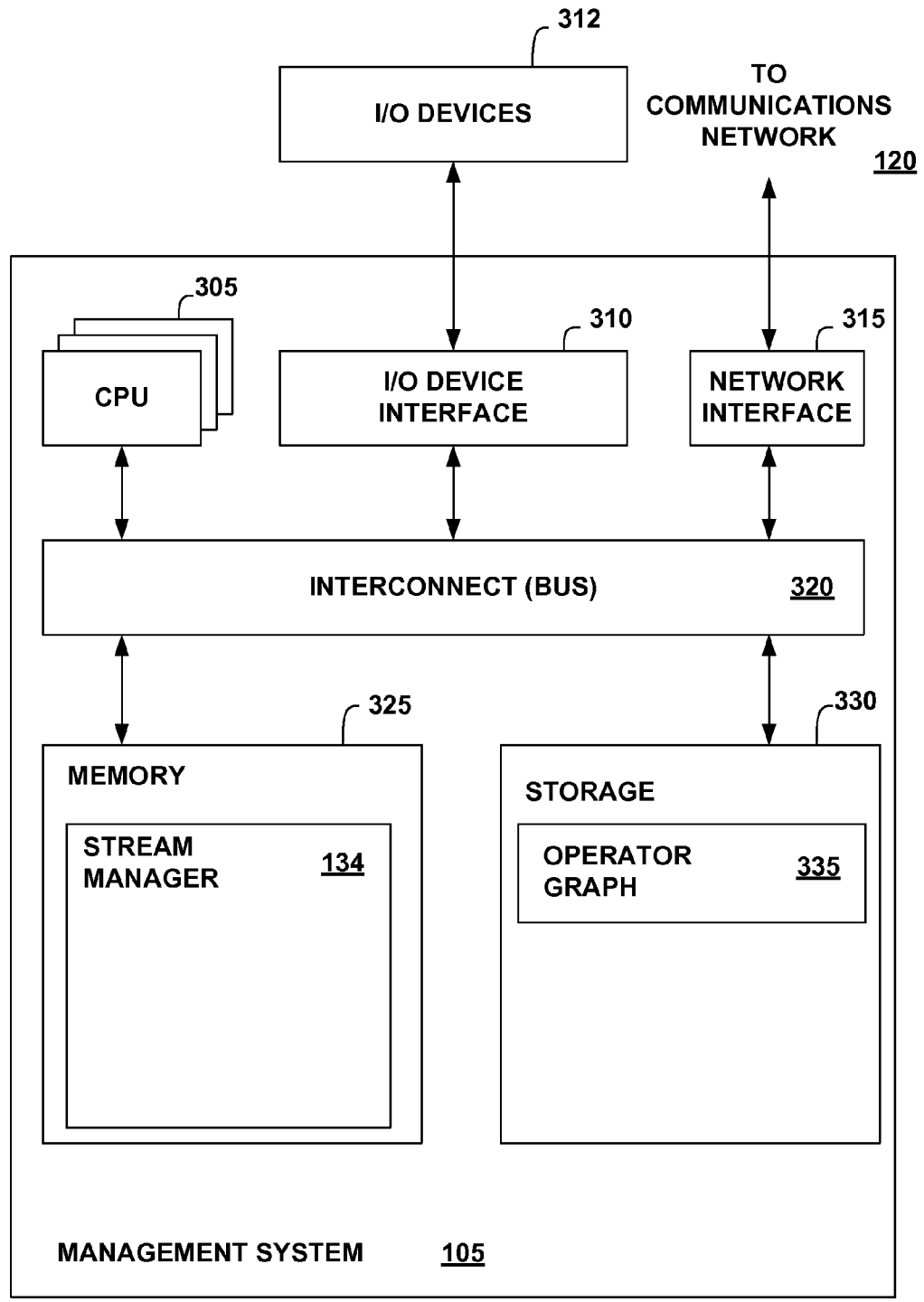
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 305, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

Figure 4:
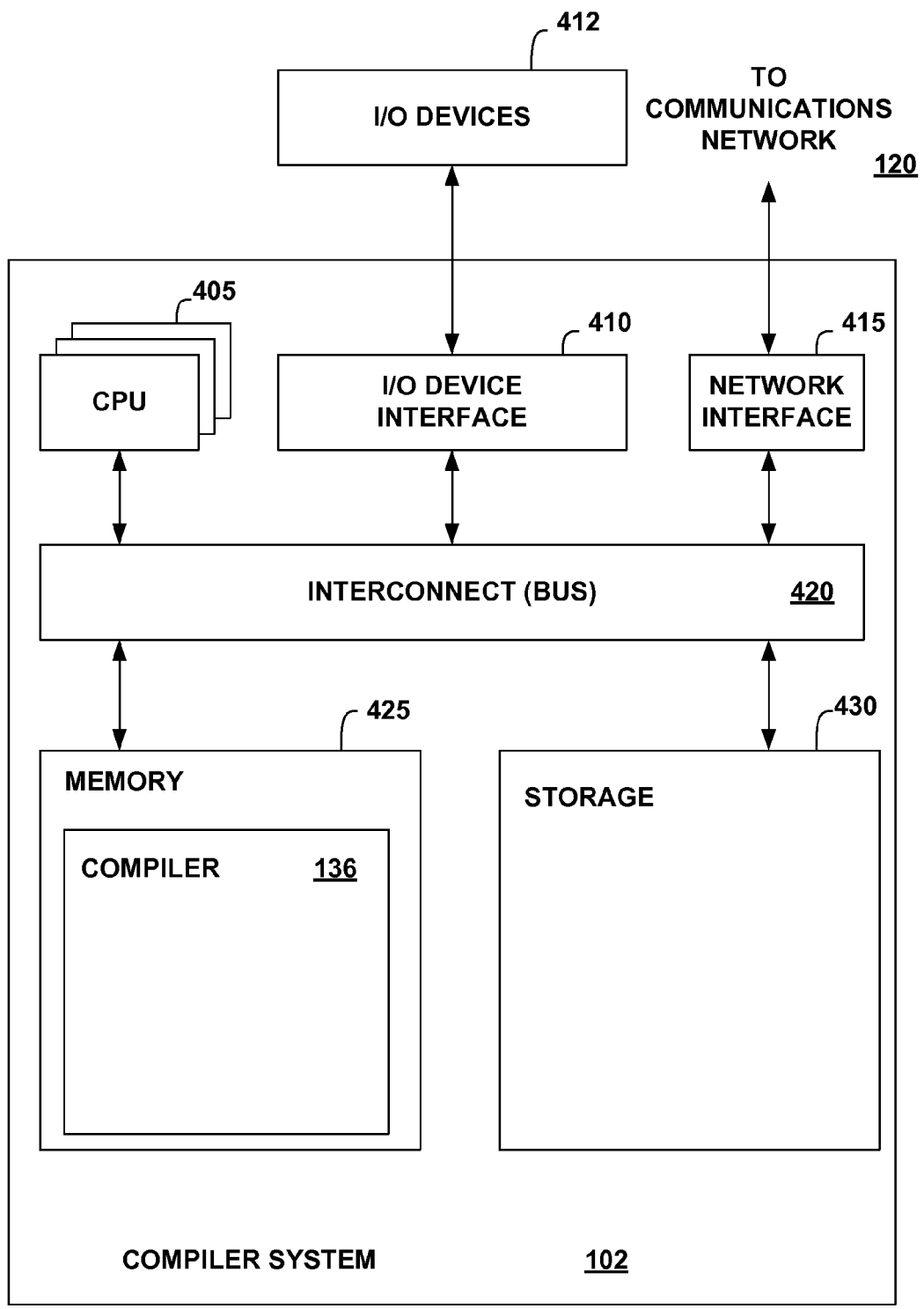
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing stream operators may improve performance by reducing the number of calls to a transport. While fusing stream operators may provide faster communication between stream operators than is available using inter-process communication techniques, any decision to fuse stream operators requires balancing the benefits of distributing processing across multiple compute nodes with the benefit of faster inter-operator communications. The compiler 136 may automate the fusion process to determine how to best fuse the stream operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
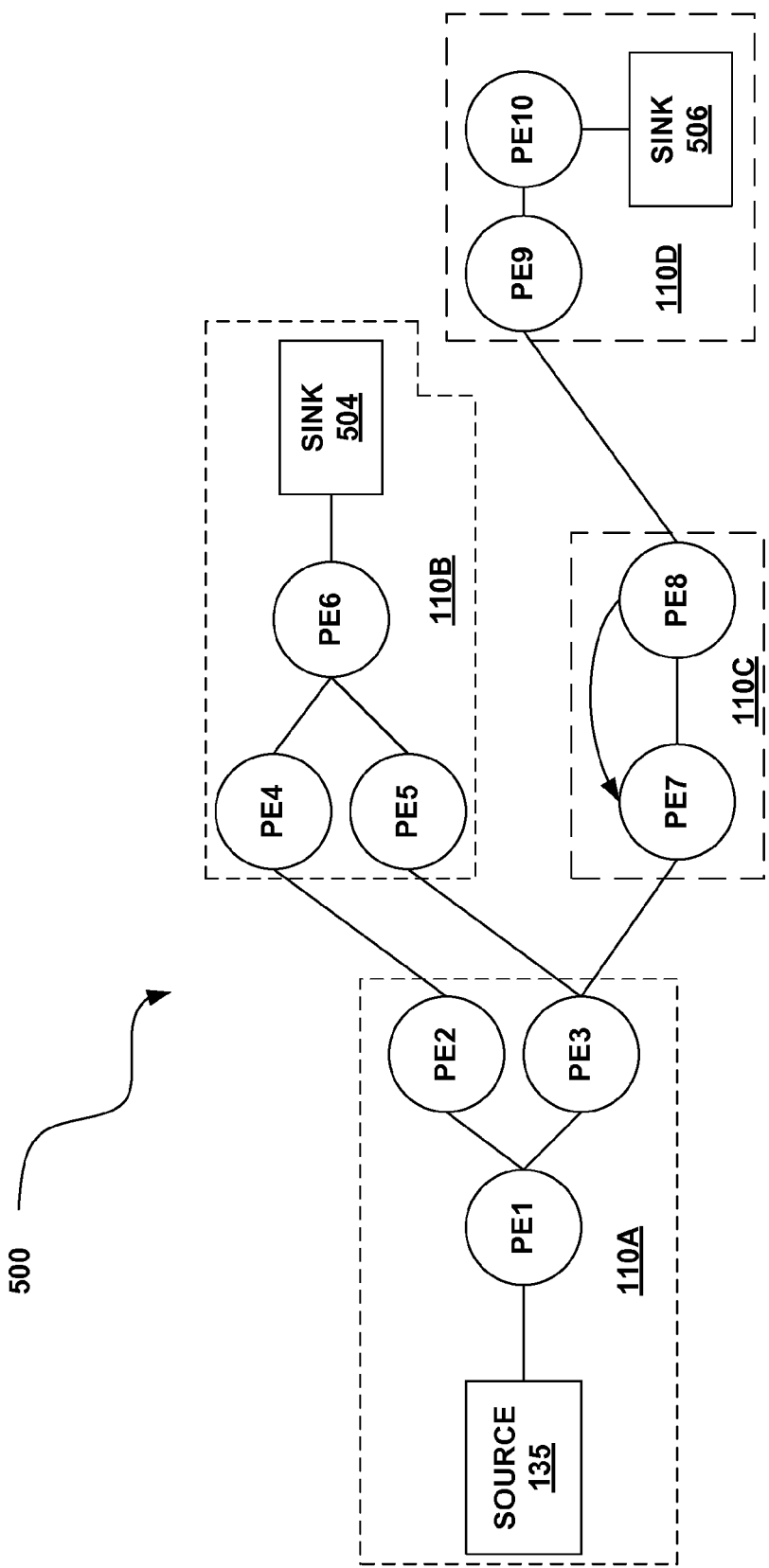
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Data that flows to PE2 is processed by the stream operators contained in PE2, and the resulting tuples are then output to PE4 on compute node 110B. Likewise, the tuples output by PE4 flow to stream operator sink PE6 504. Similarly, tuples flowing from PE3 to PE5 also reach the stream operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by stream operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D. One example of a stream computing application is IBM®'s InfoSphere® Streams (note that InfoSphere® is a trademark of International Business Machines Corporation, registered in many jurisdictions worldwide).

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
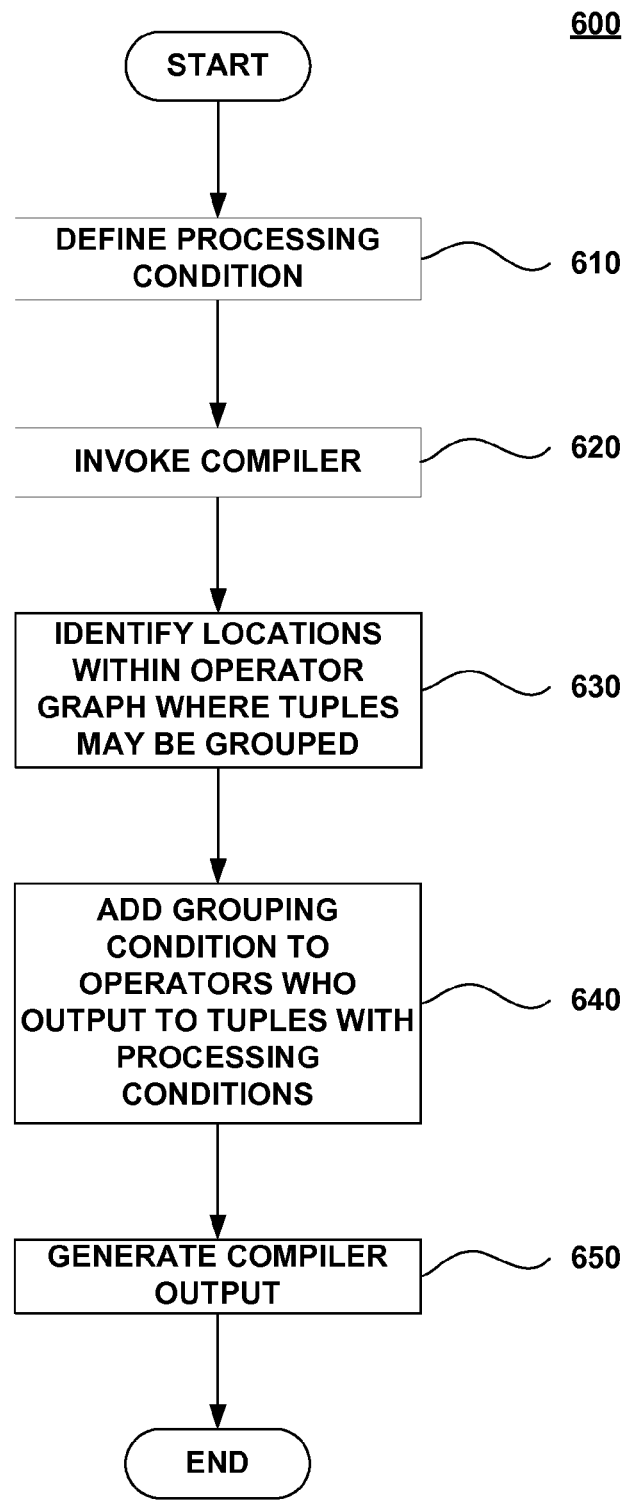
FIG. 6 illustrates a method for compile-time grouping of tuples according to various embodiments.

FIG. 6 is a flowchart illustrating a method 600 to group tuples in a streaming environment during compile-time, according to some embodiments. Generally, the operations of the method 600 may modify the processing within an operator graph by adding one or more grouping conditions to one or more stream operators. Grouping conditions may be added when initializing the streaming application. Initializing may, in some embodiments, include compiling the streaming application using a compiler system such as compiler system 102 of FIG. 1. The grouping conditions may be added at a stream operator that provides input to other stream operators having one or more processing conditions. Alternatively, the grouping condition may be added two or more levels from the stream operator with the corresponding processing condition. The grouping condition may specify that tuples be grouped in a manner similar to the one or more processing conditions. The method 600 may additionally modify the processing within an operator graph by adding one or more grouping conditions at a stream operator, such as a sink operator, within the operator graph where processing may be delayed. For example, a grouping condition may be added in order to limit the number of times a sink writes to a memory, for example a disk, which may improve the application's performance. In some embodiments, it may be possible to add grouping conditions to modify processing based on historical data, such as output patterns, gathered by a streaming system during runtime. In other embodiments, a default grouping condition may be applied by the compiler.

At operation 610, which is described in greater detail below in conjunction with FIG. 7, a processing condition may be defined. A processing condition may allow an application programmer to define one or more constraints within which tuples are to be processed. If the constraints are not met, subsequent processing may be delayed or deemed unnecessary. Processing conditions may be defined as part of the properties of a stream operator in the operator graph and enforced at compilation or runtime.

At operation 620, a compiler, such as compiler 136 of FIG. 4, may be invoked. During compiling, at operation 630, a compiler, e.g., compiler 136, may identify stream operators within an operator graph where tuples may be grouped. In some embodiments this may include a stream operator at which one or more processing conditions exist. A processing condition identified in operation 630 may, for example, be based on conditions such as those described in FIG. 7 below, e.g., windowing conditions and output requirements. In other embodiments, a stream operator within an operator graph at which tuples may be grouped may be a stream operator at which processing may be delayed. For example, processing may be delayed at a sink, e.g., sink 824 of FIG. 8, which may write data to a memory, for example, a disk. A memory writing operation may be set to occur only at specified time intervals, upon receiving a specified tuple count, upon receiving a specified tuple attribute value, combinations thereof, or other suitable methods. In other embodiments, a compiler, e.g., compiler 136, may be able to use historical data, such as output patterns, obtained from running the application to identify stream operators at which tuples may be grouped. A compiler may, for example, identify a stream operator which historically outputs at a determined time interval, which may allow the compiler to estimate a group size that would be comparable to that sent over the determined time interval and create a corresponding grouping condition.

In other embodiments, a compiler, e.g., compiler 136, may add a grouping condition to a stream operator based on a default condition. In some embodiments, a default condition may, for example, include an input tuple group size specified by the application programmer. In other embodiments, a default condition may include an output tuple group size specified by the application programmer. For example, an application programmer may configure a particular stream operator so that a specified number of tuples are grouped prior to sending to another stream operator within the operator graph. In other embodiments, an application programmer may specify that an operator requires a group of tuples as its input. In these and other similar embodiments, a compiler, e.g., compiler 136, may be able to identify these grouping conditions specified by the application programmer and add the specified grouping condition to the corresponding stream operator. In some embodiments, the compiler may be able to override the user-specified group size if historical data provides a more optimal configuration. In some embodiments, a compiler, e.g., compiler 136, may be able to provide a default grouping condition when the compiler is unable to identify processing conditions.

At operation 640, a compiler, e.g., compiler 136, may modify processing at a stream operator. The modification to the stream operator may include adding a grouping condition. The grouping condition may notify a particular stream operator to group tuples in a manner similar to a corresponding processing condition in a stream operator that receives input from the particular stream operator. Alternatively, the grouping condition may be added two or more levels from the stream operator with the corresponding processing condition. Accordingly, a grouping condition may be, for example, time-based, count-based, attribute value-based, or punctuation-based depending on the corresponding processing condition. The grouping may provide for outputting one group of tuples instead of two or more individual tuples, thereby reducing network traffic and dependency, which may improve the overall performance of the stream-based application. In an embodiment in which a compiler identifies a stream operator as a sink, the compiler may add a grouping condition at the stream operator providing input to the sink such that the tuples will be grouped and only output to the sink when the grouping condition is met. In an embodiment in which a compiler, e.g., compiler 136, uses historical data, such as output patterns, to identify potential stream operators for grouping tuples, the grouping condition added may estimate a group size based on the historical data.

At operation 650, after modifying a stream operator, e.g., stream operator 810 of FIG. 8, the compiler, e.g., compiler 136, may generate a set of deployable artifacts that may include a set of processing elements and an application description language file (ADL file), according to some embodiments. In other embodiments, the compiler may translate the modules into an intermediate form before translating the intermediate form into object code (described above).

Figure 7:
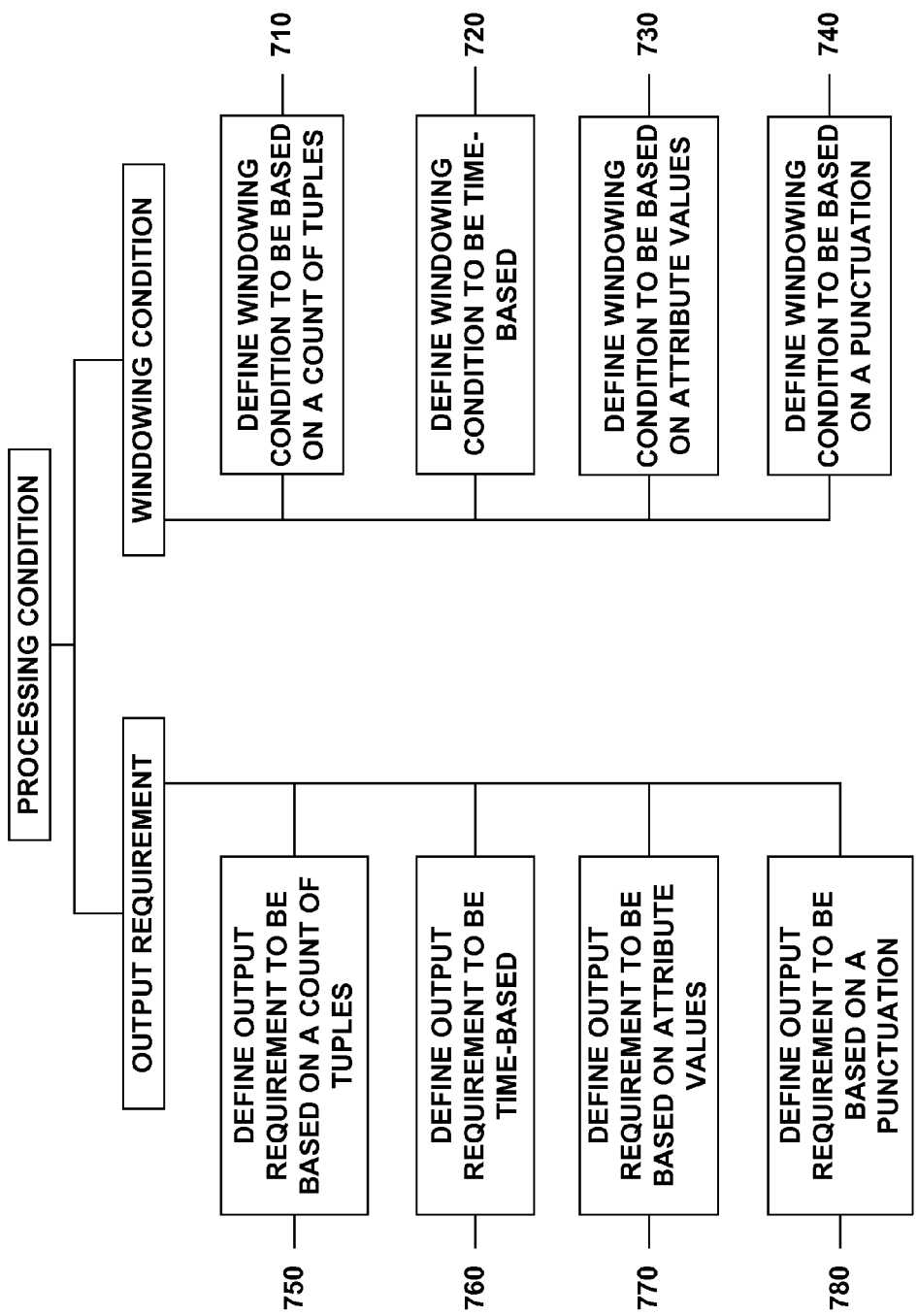
FIG. 7 illustrates types of processing conditions according to various embodiments.

FIG. 7 is a diagram illustrating examples corresponding to operation 610 of FIG. 6 to define a processing condition in a stream-based computing environment, according to some embodiments. A processing condition may include, for example, a windowing condition, such as the windowing conditions of 710-740 or an output requirement, such as the output requirements of 750-780. In some embodiments, one or more processing conditions may be defined using windowing conditions and one or more processing conditions may be defined using output requirements.

One or more processing conditions may be defined using windowing, according to some embodiments. A window, as referred to herein, is a logical container for tuples received by an input port of a stream operator. Windowing may allow for creation of subsets of data within a streaming application. A stream operator may not necessarily support windowing by default. A stream operator may, however, be configured to support windowing. Both tumbling and sliding windows may store tuples according to various conditions. A tumbling window may store incoming tuples until the window is full, then may trigger a stream operator behavior, flush all stored tuples from the window, and then may begin this process again. Conversely, a sliding window does not automatically flush the window when the trigger condition is fulfilled. A sliding window also has an eviction policy that tells the window when to flush the window and begin this process again. These conditions may be referred to herein as windowing conditions. Windowing may be defined in any number of ways. For example, an application programmer may define one or more specific windowing conditions. Additionally, the system may provide a set of windowing conditions.

At windowing condition 710, a processing condition may be defined to be a windowing condition based on a count of tuples received at a stream operator equaling a specified count of tuples, according to some embodiments. For example, the processing condition may specify that tuples are to be processed once a window with a count size of ten is filled. If ten tuples are received at a stream operator, e.g., stream operator 820 of FIGS. 8A and 8B, then processing may be triggered by the stream operator.

At windowing condition 720, a processing condition may be defined to be a windowing condition based on the expiration of a specified period of time, according to some embodiments. In this context, tuples are to be processed only at specified time intervals. For example, an application programmer may specify that a particular stream operator is only to complete processing every ten seconds. In this example, all tuples received within a ten-second time period may be processed at the completion of that ten-second time period. That is, if five hundred tuples are received during a ten-second time period, they may be stored in the stream operator's buffer until the ten seconds are up, at which point the five hundred tuples would be processed by the stream operator.

At windowing condition 730, a processing condition may be defined to be a windowing condition based on a change in an attribute value of the tuples received, where the change exceeds a specified threshold, according to some embodiments. The windowing condition may be similar to a time-based windowing condition in some embodiments. For example, an application programmer may specify that processing at the stream operator should be triggered only when a timestamp attribute between a first tuple received and an nth tuple received is greater than or equal to five seconds. In such an example, tuples may be held in a stream operator's buffer until the attribute value variation fulfills the condition, at which point the tuples are processed.

At windowing condition 740, a processing condition may be defined to be a windowing condition based on a punctuation, according to some embodiments. A punctuation is a control signal that appears interleaved with the tuples in a stream. The punctuation may, for example, notify the stream operator of the grouping of tuples to be processed. An example of where punctuation may be used is within an Aggregate stream operator. Every time the stream operator receives a punctuation, it may aggregate the accumulated tuples since the last window punctuation.

A processing condition may include an output requirement, according to some embodiments. An output requirement, as referred to herein, is a condition that may need to be met in order for a stream operator, e.g., stream operator 820 of FIG. 8, to output a tuple. Processing conditions based on output requirements are described in greater detail in operations 750-780.

At output requirement 750, a processing condition may be defined based on a requirement that specifies a count of tuples in order to output a tuple, according to some embodiments. Processing conditions based on output requirements may operate similarly to the windowing conditions described above. For example, a tuple count output requirement may only be output after n number of tuples is received.

At output requirement 760, a processing condition may be defined based on a requirement that specifies a time period that may need to expire in order to output a tuple, according to some embodiments. For example, tuples may be output only at specified time intervals. An application programmer may specify that a particular stream operator is only supposed to provide its output every ten seconds. In this example, all tuples received within that ten-second time period would be processed, but the resulting tuples would not be output until the time period has expired. That is, if five hundred tuples are processed during a ten-second time period, they may only be output after the ten seconds are up, at which point the five hundred tuples would be output by the stream operator.

At output requirement 770, a processing condition may be defined based on a requirement that specifies a change in an attribute value of the tuples received, where the change exceeds a specified threshold. The processing condition may, in some embodiments, be similar to a time-based processing condition. For example, an application programmer may specify that output at the stream operator should be triggered only when a timestamp attribute between a first tuple received and an nth tuple received is greater than or equal to five seconds. In such an example, tuples may be held in a stream operator's buffer until the attribute value variation fulfills the condition, at which point the tuples are output.

At output requirement 780, a processing condition may be defined based on a requirement that specifies receipt of a punctuation. A punctuation is a control signal that appears interleaved with the tuples in a stream. The punctuation may, for example, notify the stream operator of the end of a stream. An example of where punctuation may be used is to only output after the end of the stream is received. Every time the stream operator receives a punctuation, it outputs the tuples it has processed.

FIGS. 8A and 8B show more detailed views of operator graphs 800A and 800B of a streaming application in which incoming tuples may be grouped, according to some embodiments. Operator graphs 800A and 800B show simplified execution paths for illustrative purposes. While the stream operators with grouping conditions are depicted one level away from the stream operators with one or more processing conditions, alternatively, the grouping condition may be added two or more levels from the stream operator with the corresponding processing condition in some embodiments. Each of the operator graphs contains a source 135, two stream operators 810, 820, and a sink 824. Other embodiments may include additional stream operators and additional execution paths. FIG. 8A illustrates an embodiment in which the input tuples are not being grouped at stream operator 810. FIG. 8B illustrates an embodiment in which input tuples are being grouped by stream operator 810.

FIG. 8A illustrates various embodiments in which tuples may flow through an operator graph without being grouped together. Source 135 outputs a data stream. Tuples 802-808 are representative of tuples in the data stream of various embodiments and may become the input to stream operator 810. Stream operator 810 may have a grouping condition 822 that was added during compiling. For example, grouping condition 822 may require that all tuples having a specific attribute value be grouped during a 30-second window. In such an example, the grouping condition 822 may not be met. When a grouping condition is not met, a stream operator such as stream operator 810 may output individual tuples. In some embodiments, therefore, stream operator 810 may output one tuple for each input tuple—for example, stream operator 810 may output tuples 812-818. In other embodiments, the grouping conditions may be met and stream operator 810 may be able to output a group of tuples (not shown in FIG. 8A, but the result would be similar to FIG. 8B). Stream operator 820 may then receive the input tuples and may perform some processing; stream operator 820 may then output tuples to sink 824.

FIG. 8B illustrates various embodiments in which tuples may be grouped together, such as, for example, at stream operator 810. Source 135 outputs a data stream. Tuples 826-832 are representative of the tuples in the data stream of various embodiments and may become the input to stream operator 810. Stream operator 810 may have been configured at compile time with a grouping condition 836 that may require it to group tuples prior to being sent to stream operator 820. For example, stream operator 810 may have been configured with a grouping condition because the compiler identified a processing condition at stream operator 820. In some embodiments, stream operator 810 may group tuples, only sending the group of tuples once the processing condition of stream operator 820 is fulfilled. This may, in some embodiments, improve performance by decreasing the number of calls to the transport layer. Stream operator 820 may then receive only input tuple group 834, which includes one or more tuples, and may perform some processing on the tuple group 834. While processing the tuple group 834, the stream operator 820 may execute a process n times, where n is the number of tuples that was included in the group. Stream operator 820 may then output a tuple to sink 824, according to some embodiments.

Figure 9:
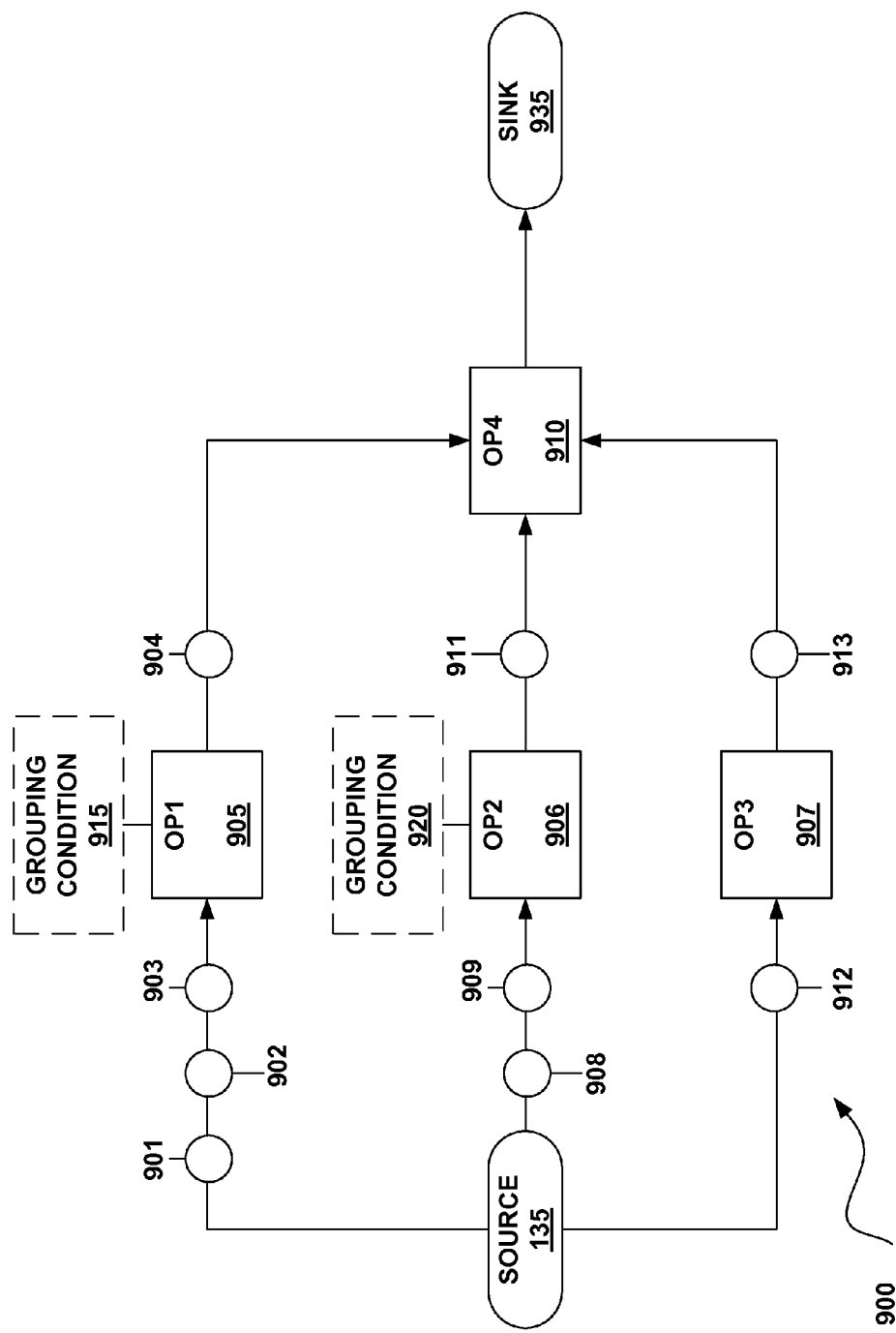
FIG. 9 illustrates a more detailed view of a tuple grouping process according to various embodiments.

FIG. 9 illustrates an operator graph 900 in which a plurality of stream operators provide inputs to a single stream operator, according to some embodiments. A plurality of stream operators may provide the input for a stream operator having a processing condition. Operator graph 900 shows simplified execution paths for illustrative purposes. While the stream operators with grouping conditions are depicted one level away from the stream operators with one or more processing conditions, alternatively, the grouping conditions may be added two or more levels from the stream operator with the corresponding processing condition in some embodiments. For example, in operator graph 900, stream operators 905, 906, and 907 may all provide input to stream operator 910. A processing condition may exist at stream operator 910. The processing condition may require different amounts of tuples to be received from each input stream operator. For example, stream operator 910 may complete its processing once it has received three tuples from stream operator 905, two tuples from stream operator 906, and one tuple from stream operator 907. Stream operator 910 may also require different amounts of data based on conditions other than count, such as time, punctuation, or attribute values. In other embodiments, stream operator 910 may require a total of ten incoming tuples from stream operators 905, 906, and 907 before processing can be completed.

The compiler 136 may detect one or more processing conditions at stream operator 910 that determine when the stream operator will complete its processing and generate an output. During the compilation, the compiler 136 may add one or more grouping conditions, e.g., grouping conditions 915, 920, and 925, at stream operators 905-907 based on the one or more processing conditions of stream operator 910. The one or more grouping conditions may be different at each stream operator. For example, stream operator 905 may group three tuples before sending the group to stream operator 910. Stream operator 906 may group two tuples before sending the group to stream operator 910. Stream operator 907 may not have a grouping condition and may output one tuple for every tuple received. While this example may include grouping conditions that are count-based, it may be possible to have grouping conditions based on count, time, attribute values, punctuation, or combinations thereof. For example, grouping condition 915 may require a count of tuples, but grouping condition 920 may require tuples over a period of time.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language such as Java, Smalltalk, C++, or the like; (b) conventional procedural programming languages, such as the "C" programming language or similar programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

While the foregoing is directed to exemplary embodiments, other and further embodiments of the invention may be devised without departing from the basic scope thereof, and the scope thereof is determined by the claims that follow.

What is claimed is:

1. A method for initializing a streaming application for execution on one or more compute nodes with each compute node adapted to execute one or more stream operators, comprising:
    examining, with a compiler system, an operator graph with a plurality of stream operators having a first stream operator written in a first set of programming instructions that outputs a plurality of tuples to a second stream operator;
    determining, with the compiler system, an existence of a defined processing condition at the second stream operator of the plurality of stream operators during compile-time, the defined processing condition includes a tumbling windowing condition that arranges a subset of tuples to be processed by the second stream operator from an input of the plurality of tuples by storing incoming tuples until a window is full, and flushing the stored tuples from the window; and
    modifying the first stream operator, with the compiler system during compile-time, by compiling code that results in adding a grouping condition into the first stream operator of the plurality of stream operators in response to the determining of the existence of the defined processing condition at the second stream operator, wherein the grouping condition causes the first stream operator to output a specific group of tuples from the plurality of tuples to the second stream operator, wherein adding a grouping condition causes the first stream operator to have a second set of programming instructions different than the first set of programming instructions.

2. The method of claim 1, wherein the compiling code occurs by compiling the streaming application in a profiling mode, running the streaming application, and re-compiling the streaming application which results in fusing the first stream operator into the second stream operator.

3. The method of claim 1, wherein the compiling code also results in inserting an inserted stream operator between the first stream operator and the second stream operator, wherein the first stream operator outputs to the inserted stream operator and the inserted stream operator outputs to the second stream operator.

4. The method of claim 1, wherein the defined processing condition includes an output requirement that defines a condition necessary for the second stream operator to output a processed tuple.

5. The method of claim 1, wherein the defined processing condition defines one or more constraints within which tuples are to be processed.

6. The method of claim 1, wherein determining the existence of the defined processing condition includes examining the plurality of tuples saved to a memory for usage of the defined processing condition.

7. The method of claim 1, wherein adding the grouping condition includes:
    identifying the time interval of the output of the plurality of tuples from the first stream operator to the second stream operator for a particular input of tuples;
    estimating a number of tuples from the plurality of tuples for the time interval based on historical data of the first stream operator in runtime; and
    creating the grouping condition based on the estimated number of tuples from the plurality of tuples.

8. The method of claim 1, wherein the defined processing condition includes a default condition that specifies an input tuple group size specified by an application programmer.

* * * * *